United States Patent
Dwyer et al.

(10) Patent No.: US 7,532,765 B2
(45) Date of Patent: May 12, 2009

(54) RUN LENGTH ENCODED DIGITAL IMAGE

(75) Inventors: Michael K. Dwyer, El Dorado Hills, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 1160 days.

(21) Appl. No.: 10/335,377

(22) Filed: Dec. 30, 2002

(65) Prior Publication Data

US 2004/0126031 A1    Jul. 1, 2004

(51) Int. Cl.
   *G06K 9/36* (2006.01)
(52) U.S. Cl. .................. 382/251; 382/232; 382/233; 382/250; 382/252; 382/253
(58) Field of Classification Search ............ 382/232, 382/233, 244, 245, 246, 248, 250, 251, 252, 382/253
   See application file for complete search history.

(56) References Cited

U.S. PATENT DOCUMENTS

| | | | | |
|---|---|---|---|---|
| 4,888,795 A * | 12/1989 | Ando et al. | ............. | 348/14.14 |
| 4,903,317 A * | 2/1990 | Nishihara et al. | ........... | 382/244 |
| 5,253,078 A * | 10/1993 | Balkanski et al. | ........... | 382/250 |
| 5,409,119 A * | 4/1995 | Rao Datari | .................. | 209/580 |
| 5,450,130 A * | 9/1995 | Foley | ...................... | 348/391.1 |
| 5,576,835 A | 11/1996 | Dirr | | |
| 5,583,577 A * | 12/1996 | Tsukagoshi | ................. | 348/468 |
| 5,764,374 A * | 6/1998 | Seroussi et al. | ............. | 382/244 |
| 5,818,877 A * | 10/1998 | Tsai et al. | .................... | 375/241 |
| 6,392,705 B1 | 5/2002 | Chaddha | | |
| 6,707,397 B1 * | 3/2004 | Lin | ............................. | 341/67 |
| 6,760,479 B1 * | 7/2004 | Feria | .......................... | 382/238 |
| 6,914,637 B1 * | 7/2005 | Wolf et al. | ................... | 348/473 |
| 6,982,722 B1 * | 1/2006 | Alben et al. | ................. | 345/596 |
| 6,990,246 B1 * | 1/2006 | Ferguson | .................... | 382/240 |
| 7,218,790 B2 * | 5/2007 | Smirnov | ...................... | 382/245 |
| 2002/0176508 A1 * | 11/2002 | Boyce et al. | ........... | 375/240.25 |
| 2003/0118243 A1 * | 6/2003 | Sezer et al. | ................. | 382/245 |
| 2004/0057522 A1 * | 3/2004 | Wu et al. | ............... | 375/240.26 |

* cited by examiner

*Primary Examiner*—Matthew C Bella
*Assistant Examiner*—Ali Bayat
(74) *Attorney, Agent, or Firm*—Trop, Pruner & Hu, P.C.

(57) ABSTRACT

Methods, apparatus and computer readable medium are described that compress and/or decompress digital images in a lossless or a lossy manner. In some embodiments, a display controller may quantize pels of a digital image and may identify runs of successive quantized pels which are equal. The display controller may generate a symbol to represent an identified run of pels. The symbol may comprise a run length and a quantized pel that may be used to reconstruct the run of pels. The symbol may further comprise an error vector for each of the pels of the run that may be used to further reconstruct the run of pels.

18 Claims, 5 Drawing Sheets

RUN LENGTH ENCODED DIGITAL IMAGE

BACKGROUND

Computing devices typically comprise a display controller to render digital images and to display the rendered digital images on a display device such as a computer monitor or a flat panel display. The display controller may render a digital image and store the rendered digital image in a frame buffer. The frame buffer may be located in shared system memory or in dedicated video memory. When the time comes to display the rendered digital image, the display controller may retrieve the digital image from the frame buffer and may generate a signal to display the retrieved digital image on the display device. The process of storing and retrieving digital images from the frame buffer may consume a significant amount of memory bandwidth. If the frame buffer is located in shared system memory, the performance of the computing device may be greatly reduced due to the display controller significantly reducing the available memory bandwidth for other tasks. Further, if the frame buffer is located in dedicated video memory, the video memory subsystem may be implemented with expensive memory technologies in order to supply sufficient memory bandwidth.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

The following description describes techniques for compressing and decompressing a digital image unit. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
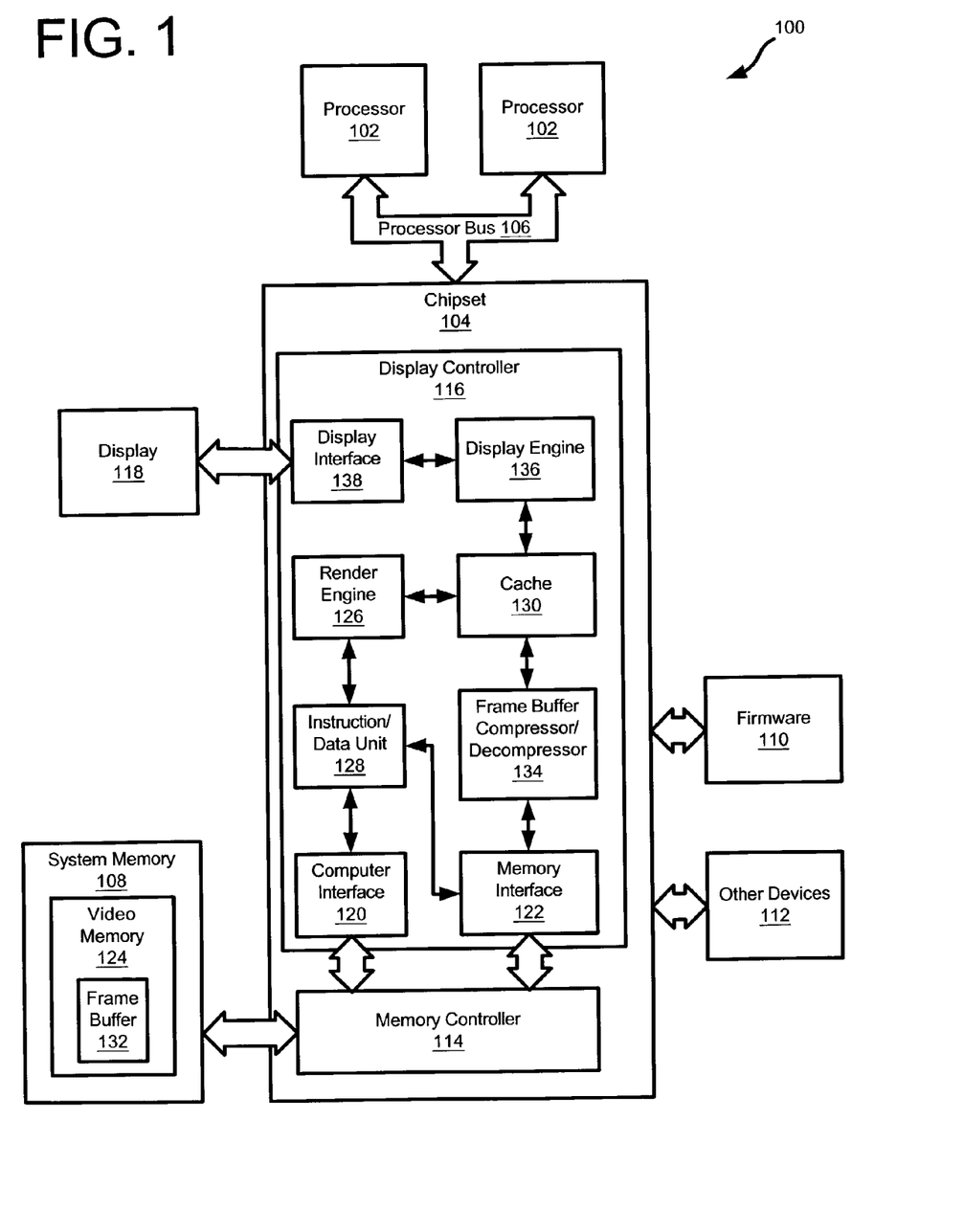
FIG. 1 illustrates an embodiment of a computing device having a chipset with an integrated display controller.

An example embodiment of a computing device 100 is shown in FIG. 1. The computing device 100 may comprise one or more processors 102 coupled to a chipset 104 via a processor bus 106. The chipset 104 may comprise one or more integrated circuit packages or chips that couple the processors 102 to system memory 108, firmware 110 and/or other devices 112 (e.g. a mouse, keyboard, disk drive, scanner, camera, etc.). The firmware 110 may comprise Basic Input/Output System routines (BIOS) the processors 102 may execute during system start-up to initialize components of the computing device 100 and to initiate execution of an operating system.

In one embodiment, the chipset 104 may comprise a memory controller 114. However, in other embodiments, the processors 102 may comprise all or a portion of the memory controller 114. The memory controller 114 may provide an interface for a integrated display controller 116 and other components of the computing device 100 to access the system memory 108. The chipset 104 may also support I/O operations on I/O buses such as peripheral component interconnect (PCI) buses, PCI-Express buses, accelerated graphics port (AGP) buses, universal serial bus (USB) buses, low pin count (LPC) buses, or any other kind of I/O bus (not shown).

The chipset 104 may further comprise an integrated display controller 116 to display digital images on a display device 118 such as, for example, a computer monitor, a flat panel, or a television. The integrated display controller 116 may comprise a computer interface 120 to receive or obtain commands and/or data from the computing device 100. The computer interface 120 may interact with the memory controller 114 to retrieve graphics commands from the system memory 108. Moreover, the computer interface 120 may provide one or more video ports such as, for example, an AGP port, PCI port, or a PCI-Express port via which the computer interface 120 may receive data and/or commands from the processors 102. The integrated display controller 116 may further comprise a memory interface 122 to obtain pels, zones, frames, tiles, etc. from video memory 124. As depicted, the system memory 108 and the video memory 124 may share or be implemented with the same physical memory devices. In such an embodiment, portions of the memory devices are statically or dynamically allocated to either system memory 108 or video memory 124. Accordingly, the memory interface 122 of the integrated display controller 116 may interact with the memory controller 114 of the chipset 104 in order to read or write pels, zones, frames, tiles, etc. to the video memory 124.

Figure 2:
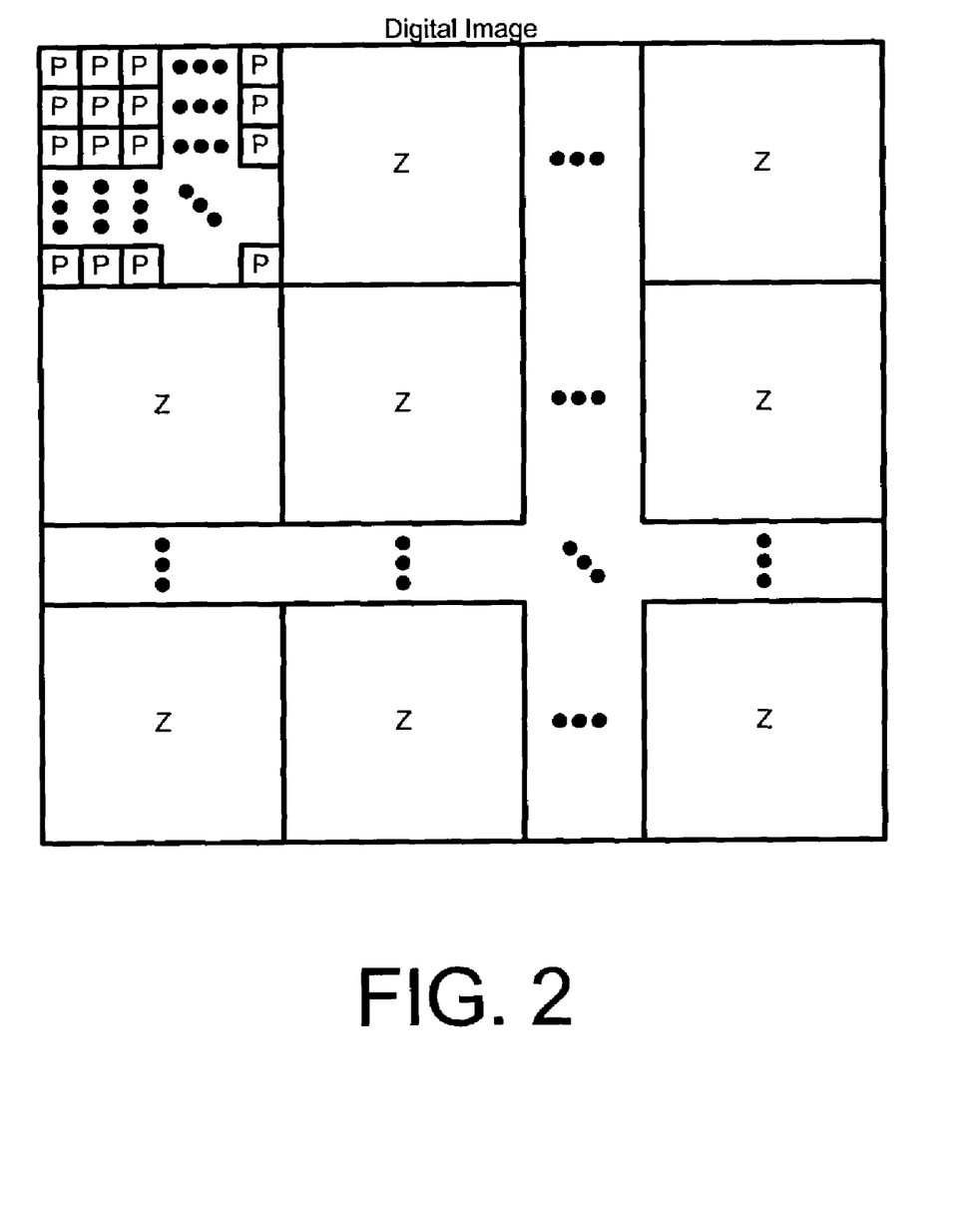
FIG. 2 illustrates an example embodiment of a digital image.

The render engine. 126 of the integrated display controller 116 may execute graphics commands to generate digital images for display. As depicted in FIG. 2 a digital image may comprise one or more rectangular non-overlapping zones. Further, each zone may comprise one or more lines of picture elements or pels, and each pel may define a visual appearance (e.g. color, shade, tint, transparency, etc.) of the digital image at a particular point of the digital image. For example, the pels may comprise one or more channels that define the appearance in accordance to a particular video format such as, for example, a RGB format, a YUV format, a RGBA format, or some other format. In RGB format, each pel comprises a red (R) channel, a green (G) channel, and a blue channel. Similarly, in RGBA format, each pel comprises a red (R) channel, a green (G) channel, a blue (B) channel, and alpha (A) channel to indicate a degree of transparency. For example, the integrated display controller 116 may implement 24-bit color by assigning each pel an 8-bit red channel, an 8-bit green channel, and a 8-bit blue channel. In the YUV format, each pel may comprise a luma (Y) channel, a first chrominance (U) channel, and a second chrominance (V) channel. Similarly, the integrated display controller 116 may implement 24-bit color by assigning each pel an 8-bit value for each of the YUV channels. However, the integrated display controller 116 may elect to represent the luma (Y) channel more precisely. Accordingly, the integrated display controller 116 may implement 24-bit YUV color by assigning each pel a 12-bit luma (Y) channel, a 6-bit first chrominance (U) channel, and a 6-bit second chrominance (V) channel. A digital image encoded in the YUV format may also use a spatially reduced chrominance format such as a 4:1:1 format. In the 4:1:1 format, a macro-pel may comprise four luma (Y) channels, one first chrominance (U) channel, and one second chrominance (V) channel that define the visual appearance of portions of the macro-pel.

The render engine 126 may execute graphics commands retrieved from the system memory 108 by the instruction/data unit 128 and may update one or more zones stored in a zone cache 130 of the integrated display controller 116. After rendering one or more zones of a digital image, the render engine 126 may cause the rendered zones to be evicted from the cache 130 and written to the frame buffer 132. The frame buffer compressor/decompressor (codec) 134 may compress the evicted zones and may provide the memory interface 122 with the compressed zones for storage in the frame buffer 132. The display engine 136 may later retrieve rendered digital images from the frame buffer 132 in order to display the digital image at an appropriate time. In particular, the display engine 136 may retrieve compressed zones from the frame buffer 132 and the codec 134 may decompress the retrieved zones. The display engine 136 may mix the decompressed zones of the digital image with other video sources such as for example, an overlay, a hardware cursor, etc. and may provide the display interface 138 with a composited video signal. The display interface 138 may convert the digital video signal received from the display engine 136 to an analog or digital signal that is suitable for the display device 118.

Figure 3:
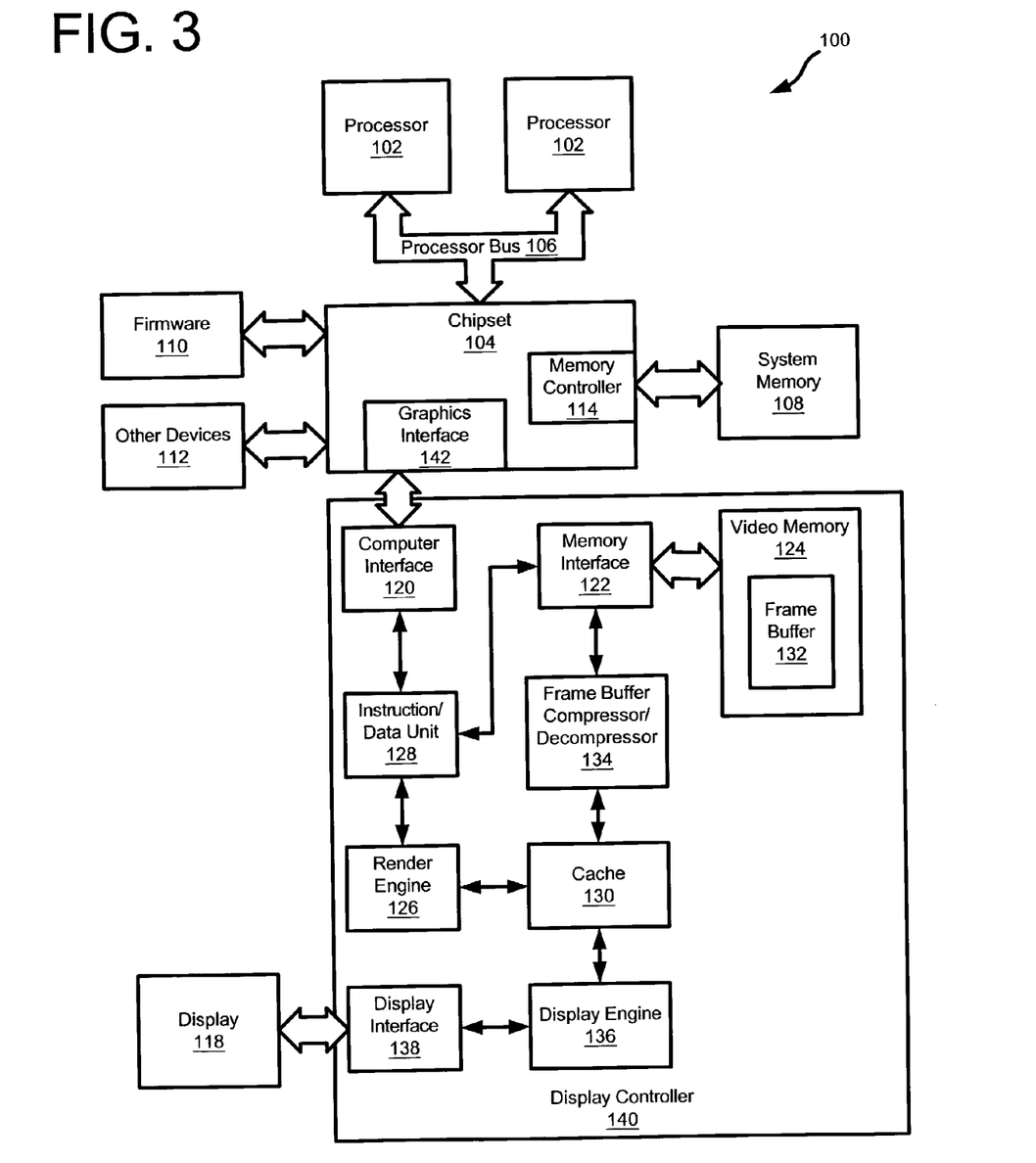
FIG. 3 illustrates an embodiment of a computing device having a display controller that is separate from the chipset.

Referring now to FIG. 3, there is illustrated yet another embodiment of the computing device 100. As depicted in FIG. 3, the computing device 100 may comprise a non-integrated display controller 140 that is separate from the chipset 104. Like the integrated display controller 116, the non-integrated display controller 140 may comprise a computer interface 120, a memory interface 122, a render engine 126, an instruction/data unit 128, a zone cache 130, a codec 134, a display engine 136, and a display interface 138. Furthermore, the non-integrated display controller 140 may comprise on-board video memory 124. The non-integrated display controller 140 may operate in a manner similar to the integrated display controller 116 of FIG. 1. However, the computer interface 120 of the non-integrated display controller 140 may comprise an AGP port, PCI port, a PCI-Express port, or some other device interface to transfer commands and/or data with a corresponding a graphics interface 142 of the chipset 104 that may also comprise an AGP port, a PCI port, a PCI-Express port, or some other device interface. Moreover, the memory interface 122 of the non-integrated display controller 140 may access the video memory 124 directly thus enabling the non-integrated display controller 140 to transfer pels, zones, tiles, frames, etc. to and from the video memory 124 without consuming significant bandwidth of the memory controller 114 and the system memory 108.

Figure 4:
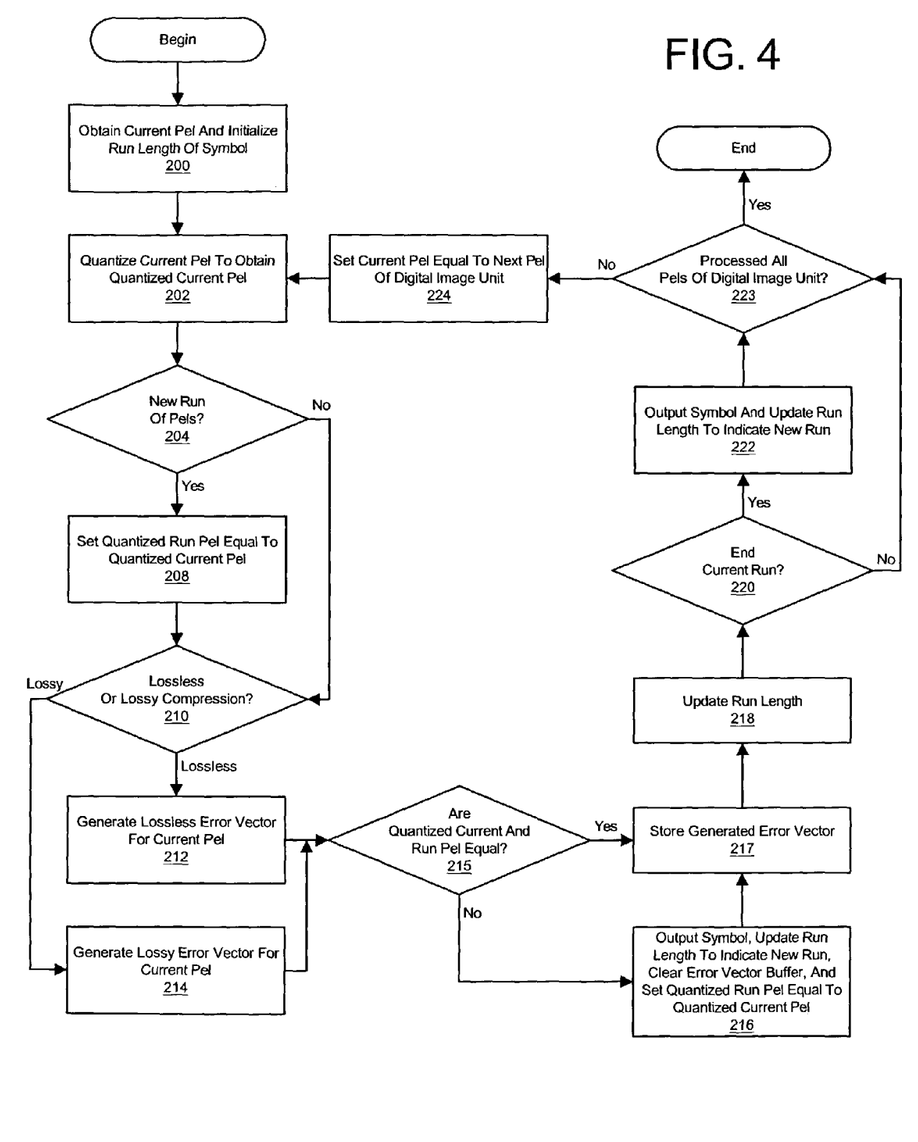
FIG. 4 illustrates a method which the display controllers of FIG. 1 and FIG. 3 may use to compress a digital image unit.

Referring now to FIG. 4, there is depicted a method that may be used by the codec 134 to compress pels of a zone line, a zone, a frame line, a frame field, a frame or some other digital image unit prior to being transferred to the frame buffer 132. In general, the method generates one or more symbols for a digital image unit wherein each symbol represents a run of one or more pels. In block 200, the codec 134 may obtain a current pel comprising one or more channels and may set a run length to an initial value (e.g. 0). In block 202, the codec 134 may quantize the current pel to obtain a quantized current pel that comprises one or more quantized channels. Each quantized channel may comprise one or more most significant bits (MSBs) of each channel and may discard one or more least significant bits (LSBs) from each channel. For example, the codec 134 may quantize a 24-bit RGB pel (e.g. 10010101-11111001-01110001) at a 18-bit quantization level to obtain a quantized current pel (e.g. 100101-111110-011100) that comprises three 6-bit quantized channels which retain the six MSBs of each channel and which discard the two LSBs of each channel. The codec 134 may utilize a variety of different techniques to obtain the quantized current pel. In one embodiment, the codec 134 may obtain the quantized current pel by performing a bit-wise AND of the channels with a mask and/or by performing appropriate bit shift operations on the channels of the current pel. Moreover, the codec 134 may quantize each channel of a pel at a different level. For example, the codec 134 for a 24-bit YUV pel may retain the 7 MSBs of the Y channel, the 6 MSBs of the U channel, and the 5 MSBs of the V channel.

In block 204, the codec 134 may determine whether a new run of pels and a corresponding new symbol has begun. In one embodiment, the codec 134 may determine that a new run has begun in response to determining that the run length has a predetermined relationship (e.g. equal) to an initial value (e.g. 0). In response to determining that a new run has begun, the codec 134 may proceed to block 210. Otherwise, the codec 134 in block 208 may set a quantized run pel equal to the quantized current pel.

In block 210, the codec 134 may determine whether to use lossless or lossy compression for the current pel. In one embodiment, the codec 134 may determine whether to use lossless or lossy compression based upon a state of one or more configuration registers (not shown) of the chipset 104 or the display controller 116, 140. In another embodiment, the codec 134 may determine whether to use lossless or lossy compression based upon load of the computing device 100. For example, the codec 134 may determine to use lossy compression or even increase the lossyness level in response to the load on the memory system, the processor, and/or some other subsystem of the computing device 100 rising above a threshold level. In particular, the codec 134 may determine to increase the lossyness in response to determining that available memory bandwidth to the system memory 108 has dropped below a certain level. The codec 134 may later decrease the lossyness or use lossless compression in response to determining that the available memory bandwidth has risen above a certain level.

In response to determining to use lossless compression, the codec 134 in block 212 may generate a lossless error vector that comprises a lossless channel error for each channel of the current pel. In particular, each lossless channel error may comprise the one or more LSBs that were discarded from the quantized channel in block 202. For example, the codec 134 may generate a 6-bit lossless error vector (e.g. [01-01-00]) that comprises a 2-bit lossless channel error for each channel of the current pel. In particular, each lossless channel error may comprise the 2 LSBs discarded from a corresponding channel during the pel quantization of block 202. The codec 134 may utilize a variety of different techniques to obtain the lossless error vector. In one embodiment, the codec 134 may obtain the lossless error vector by performing a bit-wise AND of the channels with an inverse of a mask used in block 202 and/or by performing appropriate bit shift operations on the channels of the current pel.

In response to determining to use lossy compression, the codec 134 in block 214 may generate a lossy error vector that comprises a lossy channel error for each channel of the current pel. In particular, each lossy channel error may comprise a subset of the bits discarded in the quantization of the current pel. As indicated above, the lossyness of the compression may be adjusted based upon load experienced by the computing device 100. For example, lossyness may be increased by reducing the number of bits in the subset of discarded bits used to define the lossy error vector. Similarly, lossyness may be decreased by increasing the number of bits in the subset of discarded bits used to define the lossy error vectors. For example, in response to the subset being defined as one bit, the codec 134 may generate a 3-bit lossy error vector (e.g. 0-0-0) that comprises a 1-bit lossy channel error for each channel of the current pel. In particular, each lossy channel error may comprise the MSB of the 2 LSBs discarded from each channel of the current 24-bit RGB pel in block 202. Further, the codec 134 may utilize a variety of different techniques to obtain the lossy error vector. In one embodiment, the codec 134 may obtain the lossy error vector by performing a bit-wise AND of the channels with an inverse of a mask used in block 202 and/or by performing appropriate bit shift operations on the channels of the current pel. Moreover, in one embodiment, the lossy error vector may comprise no bits thus further increasing the lossyness of the compression.

In block 215, the codec 134 may determine whether the quantized current pel has a predetermined relationship (e.g. equal) to the quantized run pel. If the quantized pels have the predetermined relationship, then the codec 134 may proceed to block 217. Otherwise, the codec 134 in block 216 may output a symbol to an output buffer that represents one or more pels, may update the run length to indicate a new run of pels, may clear the error vector buffer for the next symbol, and may set the quantized run pel equal to the quantized current pel. In one embodiment, the symbol generated by the codec 134 may comprise a run length (e.g. 0011), the quantized current pel (e.g. 100101-111110-011100), and the error vectors for the pels of the run which were stored in the error vector buffer (e.g. [01-01-00] [00-11-01] [11-11-10]). In another embodiment, the symbol may further comprise a compression mode (e.g. a 1 bit value) to indicate that the run uses lossless compression or a level of lossy compression. The symbol typically includes fewer bits than the original pel representation of the one or more bits. However, in one embodiment, the symbol actually include more bits than the original representation. For example, in one embodiment, a symbol that represents or encodes a single 24-bit RGB pel may include a 4-bit run length, an 18-bit quantized pel, and a 6-bit lossless error vector for a total of 28-bits. However, a symbol that represents or encodes two 24-bit RGB pels may include a 4-bit run length, an 18-bit quantized pel, and a 12-bit lossless error vector for a total of 34-bits.

The codec 134 in block 217 may store the obtained lossless or lossy error vector in an error vector buffer. In block 218, the codec 134 may update the run length associated with the current pel and the current run to indicate that another pel was added to the symbol. In one embodiment, the codec 134 may update the run length by incrementing the run length by one. The codec 134 in block 220 may determine whether to end the current run. In one embodiment, the codec 134 may end the current run in response to determining that the current pel is the last pel of a zone line, a zone, a frame line, a frame field, a frame or some portion of the digital image unit being encoded. In another embodiment, the codec 134 may further determine to end the current run based upon limitations of the codec 134. For example, the codec 134 may limit the run of pels represented by the symbol to a number that will not overflow registers, buffers, etc. of the codec 134 used to store the run length and/or error vector.

In response to determining to end the current run in block 220, the codec 134 in block 222 may output a symbol to an output buffer that represents one or more pels, may update the run length to indicate a new run, and may clear the error vector buffer for the next symbol. After outputting the symbol in block 222 or deciding not to end the run in block 220, the codec 134 in block 223 may determine whether all pels of the digital image unit have been encoded. If all pels have been encoded, then encoding of the digital image unit is complete and the codec 134 may exit. Otherwise, the codec 134 in block 224 may set the current pel equal to the next pel of the digital image unit. The codec 134 may then return to block 202 in order to quantize and encode the current pel.

Figure 5:
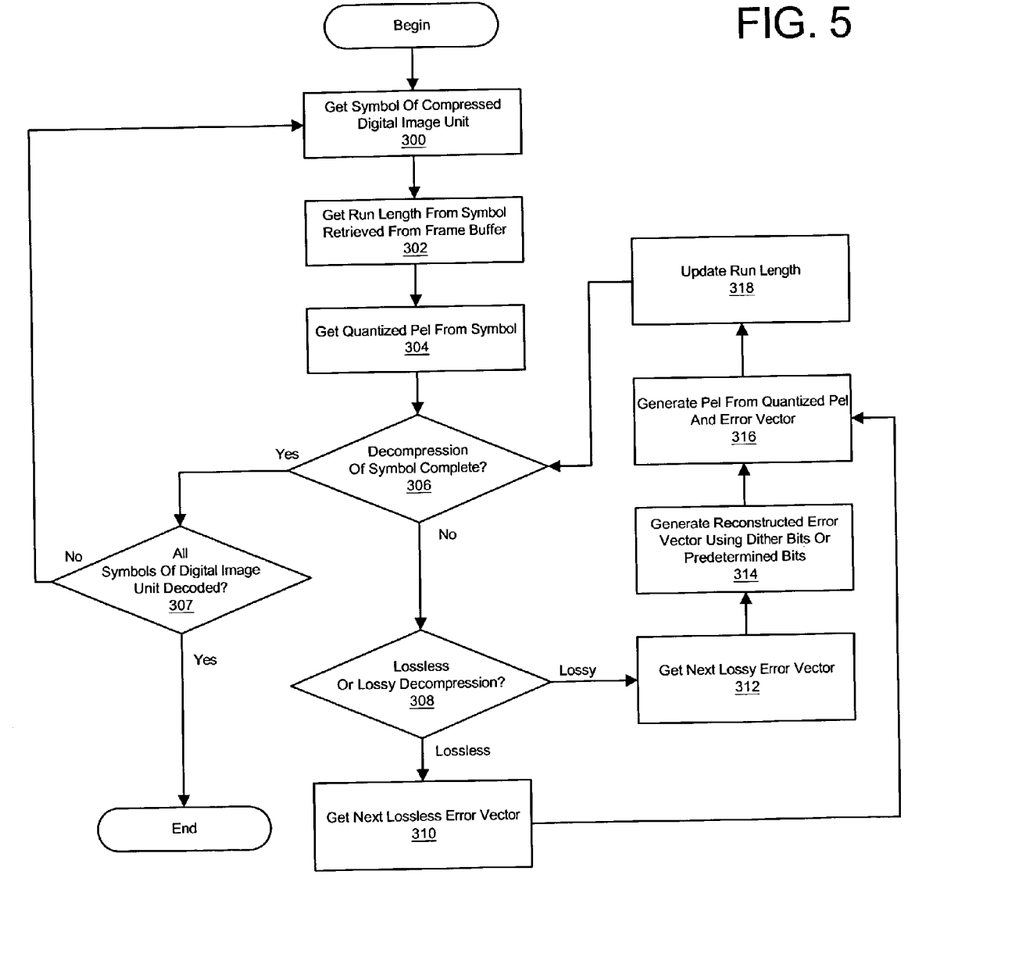
FIG. 5 illustrates a method which the display controllers of FIG. 1 and FIG. 3 may use to decompress a digital image unit.

Referring now to FIG. 5, there is depicted a method that may be used by the codec 134 to reconstruct a zone line, a zone, a frame line, a frame field, a frame or some other digital image unit from a plurality of symbols obtained from the frame buffer 132. In general, the method may be used to reconstruct a digital image from one or more symbols that represent the pels of the digital image. The codes 134 in block 300 may obtain a symbol of a compressed digital image that was retrieved from the frame buffer 132. In block 302, the codec 134 may obtain a run length from the symbol. The codec 134 in block 304 may obtain a quantized pel (e.g. [100101-111110-011100]) from the symbol. In block 306, the codec 134 may determine based upon the run length whether decompression of the symbol is complete. In one embodiment, the codec 134 may determine that decompression is not complete in response to the run length having a predetermined relationship (e.g. greater than) to a stop value (e.g. 0).

In response to determining that decompression is complete, the codec 134 in block 307 may determine whether all symbols of the digital image unit have been decoded. If all symbols of the digital image unit have been decoded, then decoding of the digital image unit is complete and the codec 134 may exit. Otherwise, the codec 134 may return to block 300 to get the next symbol of the digital image unit.

In response to determining that decompression is not complete, the codec 134 in block 308 may determine whether to perform lossy or lossless decompression. In one embodiment, the codec 134 may determine whether to perform lossless or lossy decompression based upon one or more registers of the chipset 104, the integrated display controller 116, and/or the non-integrated display controller 140. In another embodiment, the codec 134 may determine whether to perform lossless decompression or some level of lossy decompression based upon a compression mode obtained from the symbol. In response to determining that lossless decompression is to be used, the codec 134 in block 310 may obtain the next lossless error vector (e.g. [01-01-00]) from the symbol.

In response to determining that lossy decompression is to be used, the codec 134 in block 312 may obtain the next lossy error vector (e.g. [0-0-0]) from the symbol. The codec 134 in block 314 may replace the discarded bits of the lossy error vector to obtain a reconstructed error vector. In one embodiment, the codec 134 may append a predetermined value (e.g. 0) to each lossy channel error of the lossy error vector (e.g. [0-0-0] to obtain a reconstructed error vector (e.g. [00-00-00]). In another embodiment, the codec 134 may append the current dither value (e.g. 10) to each channel error of the lossy error vector (e.g. [0-0-0]) to obtain a reconstructed error vector (.e.g [010-010-010]). In another embodiment, the codec 134 may replace the discarded bits of the lossy error vector with a dither value to obtain the reconstructed error vector. For example, the codec 134 may update a dither value of 0 to a dither value of 1 and a dither value of 1 to a dither value of 0 and may use the updated dither value to replace the discarded bits. For an embodiment that discards more than a single bit, the codec 134 may update the dither value by toggling between two central values. In particular, the codes 134 may dither two bits by toggling between 01 and 10, may dither three bits by toggling between 011 and 100, and may dither four bits by toggling between 0111 and 1000.

In block 316, the codec 134 may generate a pel from the obtained quantized pel and the obtained error vector (e.g. lossless vector or reconstructed error vector) and may store the reconstructed pel in an output buffer. In one embodiment, the codec 134 may append each channel error of the error vector to each quantized channel of the quantized pel. The codec 134 may append the channel error to the quantized channel using a number of different techniques. In particular, the codec 134 may shift the quantized channel appropriately and may perform a bit-wise OR of the shifted quantized channel and the channel error.

The codec 134 may update the run length in block 318 to indicate that a pel of the symbol has been reconstructed. In one embodiment, the codec 134 may update the run length by decrementing the run length by one. The codec 134 may then return to block 306 to determine whether decompression of the symbol is complete. If complete, then the codec 134 may return to 300 to obtain the next symbol of the compressed digital image that was retrieved from the frame buffer 132.

The computing device 100 may perform all or a subset of the example methods of FIG. 4 and FIG. 5 in response to executing instructions of a machine readable medium such as, for example, read only memory (ROM); random access memory (RAM); magnetic disk storage media; optical storage media; flash memory devices. Furthermore, while the example methods of FIG. 4 and FIG. 5 are illustrated as a sequence of operations, the computing device 100 in some embodiments may perform various illustrated operations of the methods in parallel or in a different order.

An example of lossless compressing/decompressing and an example of lossy compressing/decompressing are shown in the following Tables 1-7. In particular, Table 1 shows a zone line having four 24-bit RGB pels and Table 2 shows the four 24-bit RGB pels after being quantized to an 18-bit quantization level using 6-bits per a channel. As can be seen, the codec may generate the 18-bit quantized pels by simply dropping the 2 LSBs of each channel.

TABLE 1

Zone Line of four 24-bit RGB Pels

| Position | R channel | G Channel | B Channel |
|---|---|---|---|
| 0 | 10010101 | 11111001 | 01110000 |
| 1 | 10010100 | 11111011 | 01110001 |
| 2 | 10010111 | 11111011 | 01110010 |
| 3 | 10000000 | 11111011 | 01110001 |

TABLE 2

18-bit Quantized Pels of Zone Line

| Position | R channel | G Channel | B Channel |
|---|---|---|---|
| 0 | 100101 | 111110 | 011100 |
| 1 | 100101 | 111110 | 011100 |
| 2 | 100101 | 111110 | 011100 |
| 3 | 100000 | 111110 | 011100 |

Table 3 further shows lossless error vectors for the 18-bit quantized pels of Table 2. As can be seen from Table 3, the codec may generate 6-bit lossless error vectors by simply retaining the 2 LSBs dropped from each channel during pel quantization. Referring now to Table 4, lossy error vectors for the 18-bit quantized pels of Table 2 are shown. The codec may generate the 3-bit lossy error vectors by simply retaining the MSB dropped from each channel during pel quantization.

TABLE 3

Lossless Error Vectors For 18-Bit Quantized Pels

| Position | R Channel Error | G Channel Error | B Channel Error |
|---|---|---|---|
| 0 | 01 | 01 | 00 |
| 1 | 00 | 11 | 01 |
| 2 | 11 | 11 | 10 |
| 3 | 00 | 11 | 01 |

TABLE 4

Lossy Error Vectors For 18-Bit Quantized Pels

| Position | R Channel Error | G Channel Error | B Channel Error |
|---|---|---|---|
| 0 | 0 | 0 | 0 |
| 1 | 0 | 1 | 0 |
| 2 | 1 | 1 | 1 |
| 3 | 0 | 1 | 0 |

Referring now to Table 5, there is illustrated a lossless encoding of the four 24-RGB pels of Table 1. As depicted, the lossless encoding includes a symbol 0 at encodes pels 0, 1, and 2 of Table 1 and a symbol 1 that encodes pel 3 of Table 1. Symbol 0 comprises a 4-bit run length that indicates the symbol represents three pels. Moreover, symbol 0 comprises an 18-bit quantized pel which is equal to the 18-bit quantized pels 0, 1, and 2 of Table 2. Further, symbol 0 comprises the three 6-bit lossless error vector for pels 0, 1, and 2 as shown in Table 3. Similarly, symbol 1 comprises a run length that indicates symbol 1 represents a single pel, the 18-bit quantized pel for pel 3, and the lossless error vector for pel 3. Table 5 indicates that the two symbols represent 96 bits of pel data with only 68 bits thus providing a compressed representation of the pels 0, 1, 2, and 3. The codec may latter append the lossless error vectors of each symbol to the quantized pel of each symbol to decompress the symbols and obtain the four pels of Table 1.

TABLE 5

Lossless Symbols for Zone Line

| Symbol | Run Length | Quantized Pel | Lossless Error Vectors | Un-Enc Bits | Enc Bits |
|---|---|---|---|---|---|
| 0 | 0011 | 100101-111110-011100 | [01-01-00][00-11-01][11-11-10] | 72 | 40 |
| 1 | 0001 | 100000-111110-011100 | [00-11-01] | 24 | 28 |

Referring now to Table 6, there is illustrated a lossy encoding of the four 24-RGB pels of Table 1. As depicted, the lossy encoding includes a symbol 0 that encodes pels 0, 1, and 2 of Table 1 and a symbol 1 that encodes pel 3 of Table 1. Symbol 0 comprises a 4-bit run length equal that indicates symbol 0 represents three pels. Moreover, symbol 0 comprises an 18-bit quantized pel which is equal to the 18-bit quantized pels 0, 1, and 2 of Table 2. Further, symbol 0 comprises the 3-bit lossy error vector of Table 4 for each of pels 0, 1, and 2. Similarly, symbol 1 comprises a run length that indicates symbol 1 represents a single pel, the 18-bit quantized pel of Table 2 for pel 3, and the lossy error vector of Table 4 for pel 3. Table 6 further indicates that the two symbols represent 96 bits of pel data with only 56 bits thus providing a compressed representation of the pels 0, 1, 2, and 3.

TABLE 6

Lossy Symbols for Zone Line

| Symbol | Run Length | Quantized Pel | Lossy Error Vector | Un-Enc Bits | Enc Bits |
|---|---|---|---|---|---|
| 0 | 0011 | 100101-111110-011100 | [0-0-0] [0-1-0] [1-1-1] | 72 | 31 |
| 1 | 0001 | 100000-111110-011100 | [0-1-0] | 24 | 25 |

The codec may latter append a bit to the lossy error vectors of Table 6 to obtain a reconstruct error vector, and may further append the reconstructed error vector to the quantized pel of each symbol of Table 6 to decompress the symbols and obtain the four 24-bit pels. Table 7 shows one possible set of four 24-bit pels that may be obtained from the lossy symbols of Table 6. In particular, the four pels of Table 6 were obtained by setting the last bit position of each channel of pel 0 to 0 and toggling for each pel the last bit position of the channels. As can be seen from comparing the reconstructed pels of Table 7 with the original pels of Table 1, the LSB of each channel is sometimes correct and is sometimes incorrect but in general the reconstructed channels are very close if not equal to the original channels. In most cases, a user would be unable to discern a difference between an original digital image and a digital image reconstructed from lossy symbols.

TABLE 7

Reconstructed Zone Line From Lossy Symbols (w/Dithering)

| Position | R channel | G Channel | B Channel |
|---|---|---|---|
| 0 | 10010100 | 11111000 | 01110000 |
| 1 | 10010101 | 11111011 | 01110001 |
| 2 | 10010110 | 11111010 | 01110010 |
| 3 | 10000001 | 11111011 | 01110001 |

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   quantizing a first pel and a second pel to obtain a quantized first pel and a quantized second pel, and
   incrementing a run length associated with the first pel in response to the quantized first pel being equal to the quantized second pel, generating a symbol to represent the first pel and the second pel that comprises the quantized first pel and the run length.

2. The method of claim 1 wherein quantizing comprises
   discarding one or more least significant bits of the first pel, and
   discarding one or more least significant bits of the second pel.

3. The method of claim 2 further comprising
   generating a first error vector that comprises the one or more least significant bits discarded from the first pel,
   generating a second error vector that comprises the one or more least significant bits discarded from the second pel, and
   generating a symbol to represent the first pel and the second pel that comprises the quantized first pel, the run length, the first error vector, and the second error vector.

4. The method of claim 2 further comprising
   generating a first error vector that comprises a subset of the one or more least significant bits discarded from the first pel,
   generating a second error vector that comprises a subset of the one or more least significant bits discarded from the second pel, and
   generating a symbol to represent the first pel and the second pel that comprises the quantized first pel, the run length, the first error vector, and the second error vector.

5. The method of claim 1 wherein the first pel comprises a plurality of first channels, the second pel comprises a plurality of second channels, and the quantizing comprises
   discarding one or more least significant bits from the plurality of first channels, and
   discarding one or more least significant bits from the plurality of second channels.

6. The method of claim 5 further comprising:
   generating a first error vector that comprises the one or more least significant bits discarded from the plurality of first channels,
   generating a second error vector that comprises the one or more least significant bits discarded from the plurality of second channels, and
   generating a symbol to represent the first pel and the second pel that comprises the quantized first pel, the run length, the first error vector, and the second error vector.

7. The method of claim 5 further comprising:
   generating a first error vector that comprises a subset of the one or more least significant bits discarded from the plurality of first channels,
   generating a second error vector that comprises a subset of the one or more least significant bits discarded from the plurality of second channels, and
   generating a symbol to represent the first pel and the second pel that comprises the quantized first pel, the run length, the first error vector, and the second error vector.

8. The method of claim 7 wherein a number of bits to include in the subset is adjusted based upon load of a computing device.

9. A method comprising:
   obtaining a run length and a quantized pel from a symbol that represents one or more pels,
   constructing the one or more pels based upon the run length and the quantized pel,
   obtaining one or more error vectors from the symbol that correspond to the one or more pels of the symbol, and
   constructing the one or more pels based further upon the one or more error vectors.

10. The method of claim 9 further comprising:
obtaining one or more lossy error vectors from the symbol that correspond to the one or more pels of the symbol, and
constructing the one or more pels based further upon the one or more lossy error vectors and a predetermined value for missing bits of the one or more pels.

11. The method of claim 9 further comprising:
obtaining one or more lossy error vectors from the symbol that correspond to the one or more pels of the symbol,
constructing the one or more pels based further upon the one or more lossy error vectors, and
dithering missing bits of the one or more pels.

12. A computer-readable medium comprising a plurality of instructions which in response to being executed result in a computing device
quantizing a plurality of pels to obtain a plurality of quantized pels,
identifying runs of successive quantized pels that are equal, and
generating a symbol for each identified run of successive quantized pels that comprises a run length and one of the quantized pels of the identified run.

13. The computer-readable medium of claim 12 wherein the plurality of instructions in response to being executed further result in the computing device
generating an error vector for each of the plurality of pels that comprises one or more bits discarded from its respective pel, and
generating the symbol for each identified run such that the symbol comprises the error vectors associated with each pel of the run.

14. The computer-readable medium of claim 12 wherein the plurality of instructions in response to being executed further result in the computing device
generating an error vector for each of the plurality of pels that comprises a subset of one or more bits discarded from its respective pel, and
generating the symbol for each identified run such that the symbol comprises the error vectors associated with each pel of the run.

15. The computer-readable medium of claim 12 wherein the plurality of instructions in response to being executed further result in the computing device adjusting a number of bits to include in the subset based upon load of the computing device.

16. A computing device comprising:
a system memory to store a frame buffer, and
an integrated display controller to obtain a symbol from the frame buffer, obtain a run length and a quantized pel from the symbol, construct one or more pels based upon the run length and the quantized pel, and to obtain one or more error vectors from the symbol that correspond to the one or more pels of the symbol, and constructs the one or more pels based further upon the one or more error vectors.

17. The computing device of claim 16 wherein the integrated display controller obtains one or more lossy error vectors from the symbol that correspond to the one or more pels of the symbol, and constructs the one or more pels based further upon the one or more lossy error vectors and a predetermined value for missing bits of the one or more pels.

18. The computing device of claim 16 wherein the integrated display controller obtains one or more lossy error vectors from the symbol that correspond to the one or more pels of the symbol, constructs the one or more pels based further upon the one or more lossy error vectors and a dithering of missing bits.

* * * * *